United States Patent
Lee et al.

(10) Patent No.: US 7,328,018 B2
(45) Date of Patent: Feb. 5, 2008

(54) HANDOVER METHOD AND DEVICE FOR MOBILE NODE IN WIRELESS LAN

(75) Inventors: Jae-hwang Lee, Seoul (KR); Pyung-soo Kim, Seoul (KR); Sun-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 10/743,021

(22) Filed: Dec. 23, 2003

(65) Prior Publication Data

US 2004/0146035 A1   Jul. 29, 2004

(30) Foreign Application Priority Data

Dec. 23, 2002   (KR) ............. 10-2002-0082385

(51) Int. Cl.
*H04Q 7/20*   (2006.01)
*H04Q 7/00*   (2006.01)
*H04Q 7/24*   (2006.01)

(52) U.S. Cl. .............. 455/436; 455/437; 455/440; 370/331; 370/332; 370/338

(58) Field of Classification Search ........ 455/436–442; 370/332, 331, 338
See application file for complete search history.

(56) References Cited

U.S. PATENT DOCUMENTS

| | | | |
|---|---|---|---|
| 6,332,077 B1 | 12/2001 | Wu et al. | |
| 6,876,853 B2* | 4/2005 | Hokkanen | 455/440 |
| 2001/0044305 A1* | 11/2001 | Reddy et al. | 455/436 |
| 2002/0069278 A1* | 6/2002 | Forslow | 709/225 |
| 2002/0131386 A1* | 9/2002 | Gwon | 370/338 |
| 2002/0150063 A1* | 10/2002 | Tran | 370/332 |
| 2003/0087646 A1* | 5/2003 | Funato et al. | 455/436 |
| 2003/0125027 A1* | 7/2003 | Gwon et al. | 455/436 |
| 2003/0225887 A1* | 12/2003 | Purnadi et al. | 709/227 |
| 2004/0092264 A1* | 5/2004 | Koodli et al. | 455/436 |

FOREIGN PATENT DOCUMENTS

| | | |
|---|---|---|
| JP | 2001-94572 A | 4/2001 |
| KR | 2002-0006474 A | 1/2002 |
| KR | 2002-0023918 A | 3/2002 |

* cited by examiner

*Primary Examiner*—Lester G. Kincaid
*Assistant Examiner*—Marisol Figueroa
(74) *Attorney, Agent, or Firm*—Sughrue Mion, Pllc.

(57) ABSTRACT

A handover method and a handover device for a mobile node in a wireless LAN environment are provided. The handover method involves a) scanning beacon signals transmitted from neighboring access routers while a mobile node moves from place to place; b) predicting a new access router (NAR) based on the beacon scanning results; c) obtaining information on the predicted NAR before an L2 trigger of a link layer occurs; and d) carrying out binding update using the information on the predicted NAR when the L2 trigger of the link layer occurs.

7 Claims, 7 Drawing Sheets

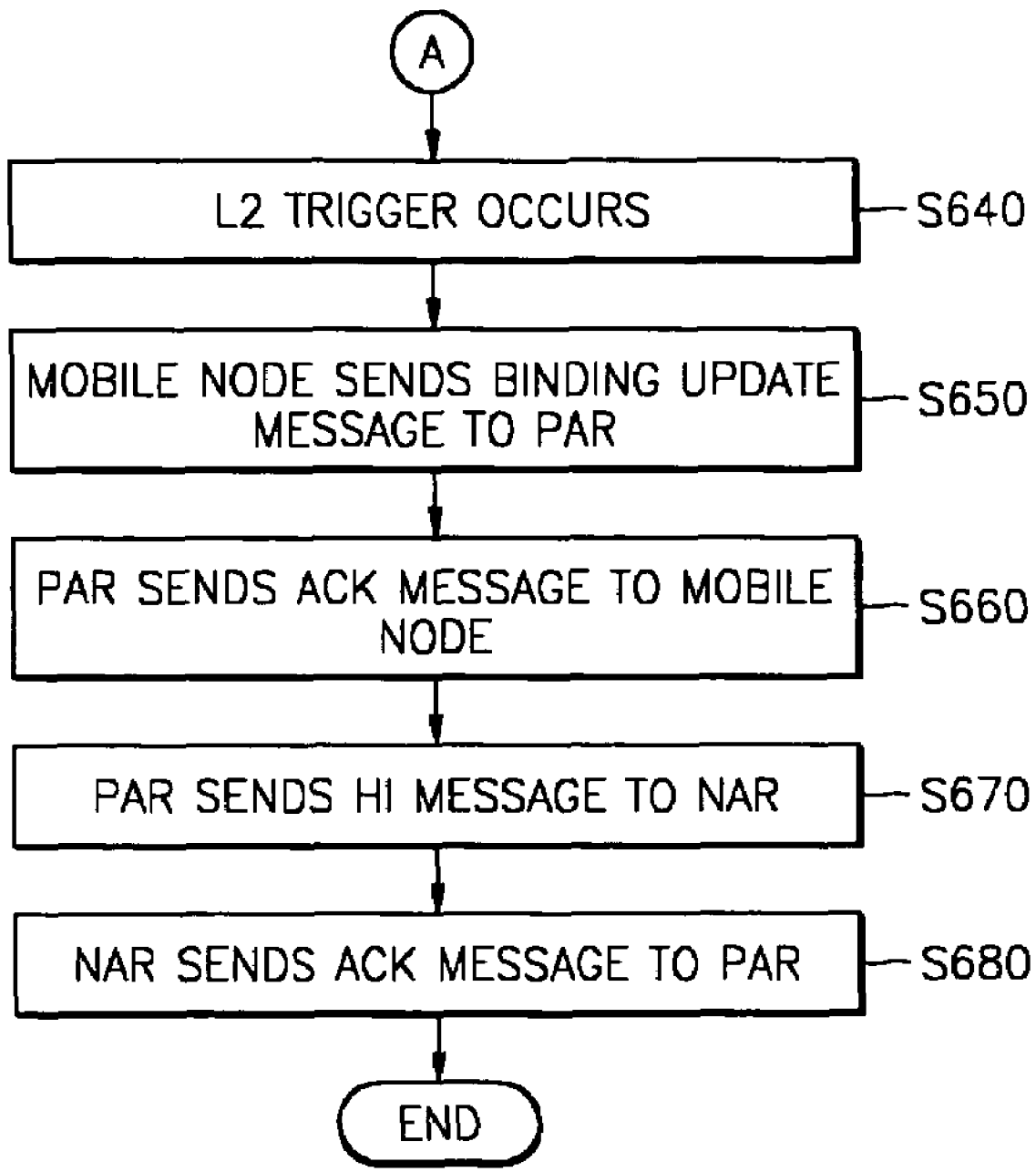

HANDOVER METHOD AND DEVICE FOR MOBILE NODE IN WIRELESS LAN

BACKGROUND OF THE INVENTION

This application claims the priority of Korean Patent Application No. 2002-82385, filed on Dec. 23, 2002, in the Korean Intellectual Property Office, the disclosure of which is incorporated herein in its entirety by reference.

FIELD OF THE INVENTION

The present invention relates to a handover method and device for a mobile node.

DESCRIPTION OF THE RELATED ART

Since the Internet has grown to become a major component of an information infrastructure, an increasing number of problems have emerged due to a sharp increase in the number of users and Internet-related devices. Accordingly, an internet protocol version 6 (IPv6) has been developed to resolve problems, such as a shortage of IP addresses, and achieve more efficient routing, better security, better mobility, and better quality of service (QoS), and its commercialization is now under way.

A mobile IPv6 device, which provides functions mainly based on IPv6, is predicted to exhibit better and more efficient mobility than its predecessors. Such a mobile IPv6 device, however, requires a handover process in layer 3 (IP layer) to provide seamless mobile communications.

Recently, an Internet draft "Fast Handovers for Mobile IPv6" (IETF: draft-ietf-mobileip-fast-mipv6-0.5.txt) suggesting an algorithm capable of quickly carrying out handover with the help of layer 2 (link layer) has been released.

In detail, a mobile IP gives a description of protocol operations necessary for maintaining access to the Internet while a mobile node undergoes handover from an access router to another access router. The protocol operations described by the mobile IP include movement detection, IP address constitution, and location update.

An access router periodically generates a beacon signal to inform adjacent mobile nodes of its identification, i.e., basic service set identification (BSSID)). In FIG. 1, a previous access router (PAR) 120 and a new access router (NAR) 130 periodically generate beacon signals to inform neighboring mobile nodes of their existence or identification. Here, the PAR 120 is a default router of a mobile node 110 before undergoing handover, and the NAR 130 is a default router of the mobile node 110 after undergoing handover.

Let us assume that the PAR 120 constitutes basic service set (BSS)1 and the NAR 130 constitutes BSS2. The mobile node 110 belongs to BSS1 when it is located at point A and belongs to BSS2 when it is located at point B. When the mobile node 110 is located at position A, it can receive a beacon signal from the NAR 130 as well as from the PAR 120, but the intensity of the beacon signal received from the NAR 130 is very weak. Likewise, when the mobile node 110 is located at position B, it can receive a beacon signal from the PAR 120 as well as the NAR 130, but the intensity of the beacon signal received from the PAR 120 is very weak.

While the mobile node 110 moves from point A to point B, there is a moment when the intensity of the beacon signal received from the NAR 130 becomes greater than the intensity of the beacon signal received from the PAR 120. At this moment, an L2 trigger of an L2 layer occurs. For example, when an L2 trigger occurs at point B, the mobile node 110 can figure out a BSSID of the NAR 130 based on the beacon signal received from the NAR 130.

The mobile node 110, then, undergoes handover by issuing a request for information on the NAR 130 to the PAR 120, analyzing the requested information, carrying out binding update, and transmitting a handover initiate (HI) message and an acknowledgement (ACK) message between the PAR 120 and the NAR 130.

The detailed description of such conventional handover is shown in FIG. 2. Referring to FIG. 2, a mobile node realizes that it is entering a new network when an L2 trigger occurs in step S210. At this stage, the mobile node can figure out a BSSID of an access router of the new network, i.e., a NAR.

In step S220, the mobile node issues a request for information on the NAR corresponding to the BSSID to a PAR by sending an RtSoIPr message to the PAR.

In step S230, the PAR searches its distributed service table (DST) for the requested information, such as prefix information, a link layer address, and an IP address of the NAR. In step S240, the PAR sends the searched information to the mobile node by sending a PrRtAdv message to the mobile node.

The mobile node, then, creates a care-of-address (CoA) based on its medium access control (MAC) address and the received prefix information of the NAR in step S250 and sends a quick binding update message (FBU message) to the PAR in step S260.

In step S270, the PAR sends an ACK message to the mobile node in response to the reception of the quick binding update message.

The PAR sends an HI message to the NAR in step S280, and the NAR sends an ACK message to the PAR in step S290.

Handover is hereby completed. If there is any packet destined for the mobile node in the middle of the handover process, the corresponding packet is transmitted from the PAR to the mobile node via the NAR. After the handover process, the mobile node uses the NAR rather than the PAR.

However, since the conventional handover process takes a considerable amount of time, the amount of time for which transmission of packets from an IP layer is delayed due to handover, i.e., handover latency, inevitably increases, thereby making it almost impossible to apply the conventional handover technique to real-time communications, such as video phone communications, video conferences, or transmission of moving images.

In the meantime, another conventional handover technique has been disclosed in Korean Patent Publication No. 2001-87890, entitled "High-Speed Handoff Using Beacon Message in Wireless LAN Environment". In the patented technique, an access router, which is subjected to handoff, periodically sends a beacon message, containing measured power intensity information and prefix information, to a user terminal, and if a request for handoff is issued, the user terminal creates an address based on the prefix information transmitted from the access router and carries out handoff using the created address. However, because the prefix information is contained in the beacon message and transmitted to the user terminal on the beacon message, the size of the beacon message inevitably is large.

SUMMARY OF THE INVENTION

The present invention provides a handover method and device for a mobile node in a wireless LAN environment, which are capable of reducing handover latency.

According to an aspect of the present invention, there is provided a handover method in a wireless LAN environment. The handover method involves a) scanning beacon signals transmitted from neighboring access routers while a mobile node moves from place to place; b) predicting a new access router (NAR) based on the beacon scanning results; c) obtaining information on the predicted NAR before an L2 trigger of a link layer occurs; and d) carrying out binding update using the information on the predicted NAR when the L2 trigger of the link layer occurs.

Preferably, in step b), if among the scanned beacon signals, there is a beacon signal whose intensity continues to increase and a ratio of the intensity of the corresponding beacon signal to the intensity of a beacon signal transmitted from a current access router (or previous access router, PAR) exceeds a predetermined value, an access router that has transmitted the corresponding beacon signal is predicted as the NAR.

According to another preferred embodiment of the present invention, there is provided a handover device for a mobile node in a wireless LAN environment. The handover device includes a beacon scanning unit which scans beacon signals transmitted from access routers adjacent to a mobile node that moves around; a NAR prediction unit which predicts a NAR based on the beacon scanning results; a preprocessing unit which obtains information on the NAR, predicted by the NAR prediction unit, before an L2 trigger of a link layer occurs; a NAR information storing unit which stores the information on the NAR, obtained by the preprocessing unit; and a binding update processing unit which carries out binding update using the information of the NAR, stored in the NAR information storing unit, when the L2 trigger of the link layer occurs.

According to still another preferred embodiment of the present invention, there is provided a computer-readable recording medium on which a program enabling the above-described handover method is written.

In order to reduce handover latency, the present invention allows some steps in a handover process to be carried out before an L2 trigger of a layer 2 occurs rather than putting off all steps of the handover process until an L2 trigger occurs.

In other words, a mobile node predicts which access router will be the next access router, i.e., a NAR, through a beacon scanning process performed in layer 2 and obtains information on the predicted access router before entering a new network. Therefore, after the mobile node enters the new network, it does not need to hasten to obtain NAR information because it already has the NAR information. As a result, this process helps reduce handover latency considerably.

BRIEF DESCRIPTION OF THE DRAWINGS

The above and other features and advantages of the present invention will become more apparent by describing in detail exemplary embodiments thereof with reference to the attached drawings in which:

FIGS. 6A and 6B are flowcharts of a handover method in a wireless LAN environment, according to an exemplary embodiment of the present invention.

DETAILED DESCRIPTION OF THE INVENTION

Figure 1:
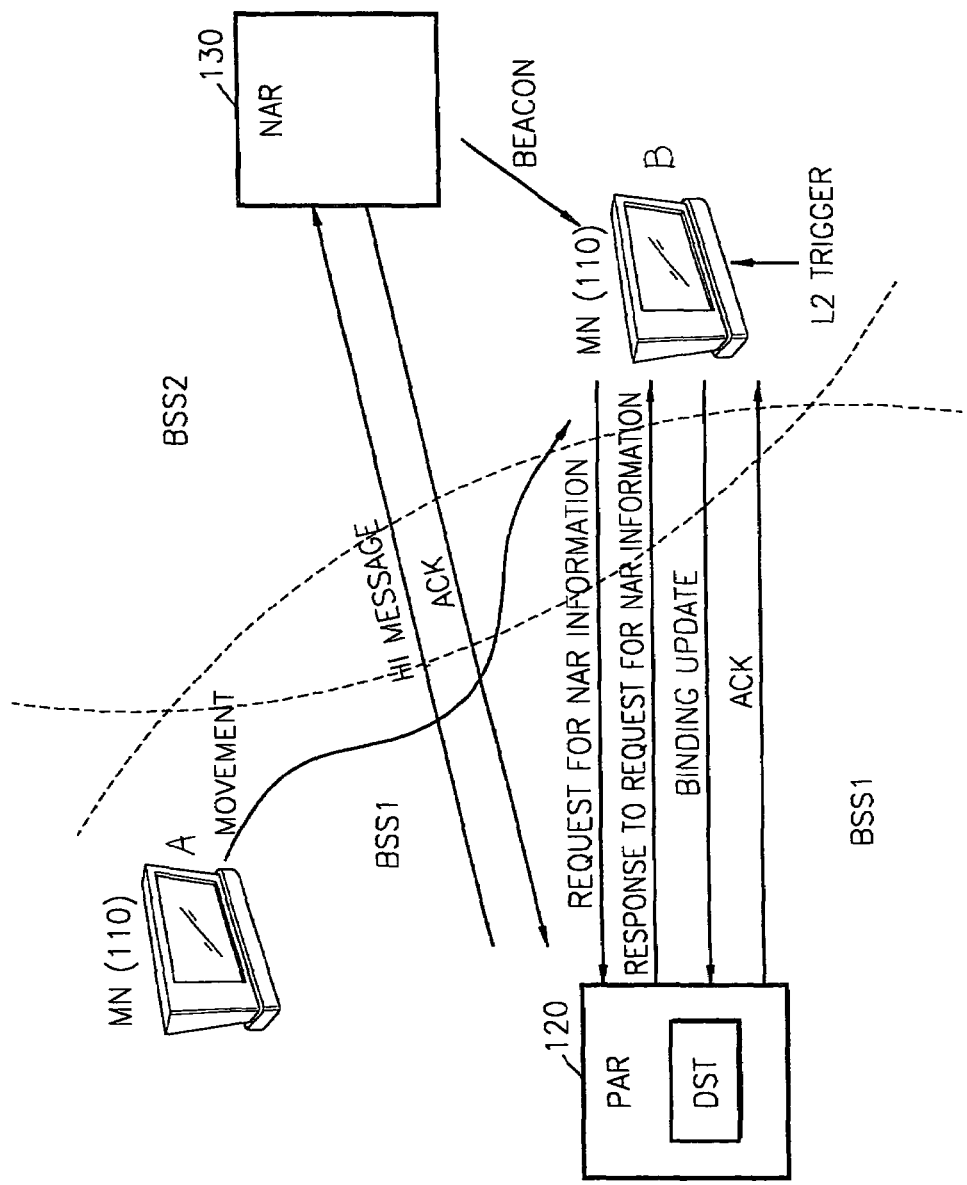
FIG. 1 is a diagram illustrating conventional handover performed in a network system in a wireless LAN environment.
Figure 2:
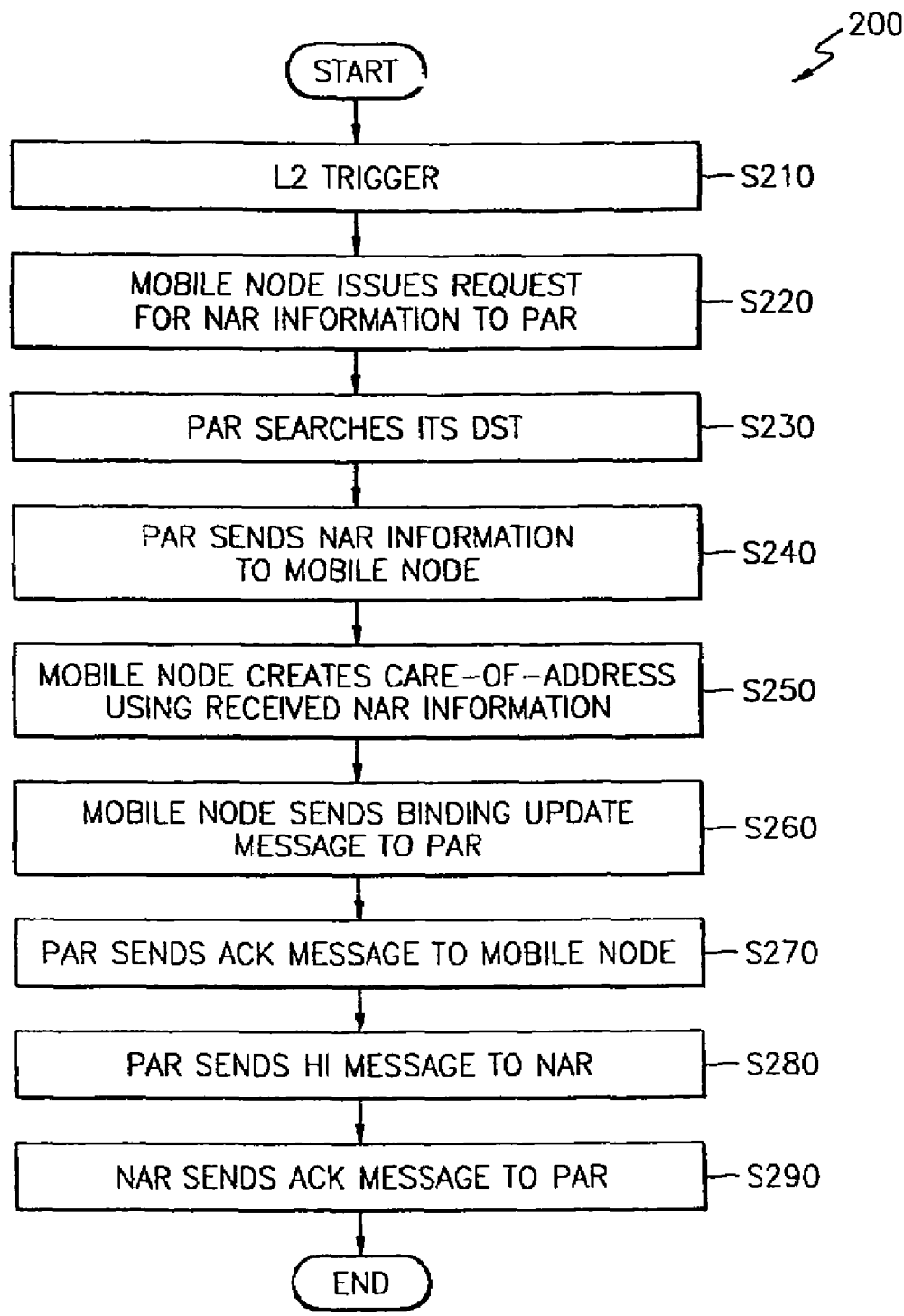
FIG. 2 is a flowchart of a conventional handover method in a wireless LAN environment.
Figure 3:
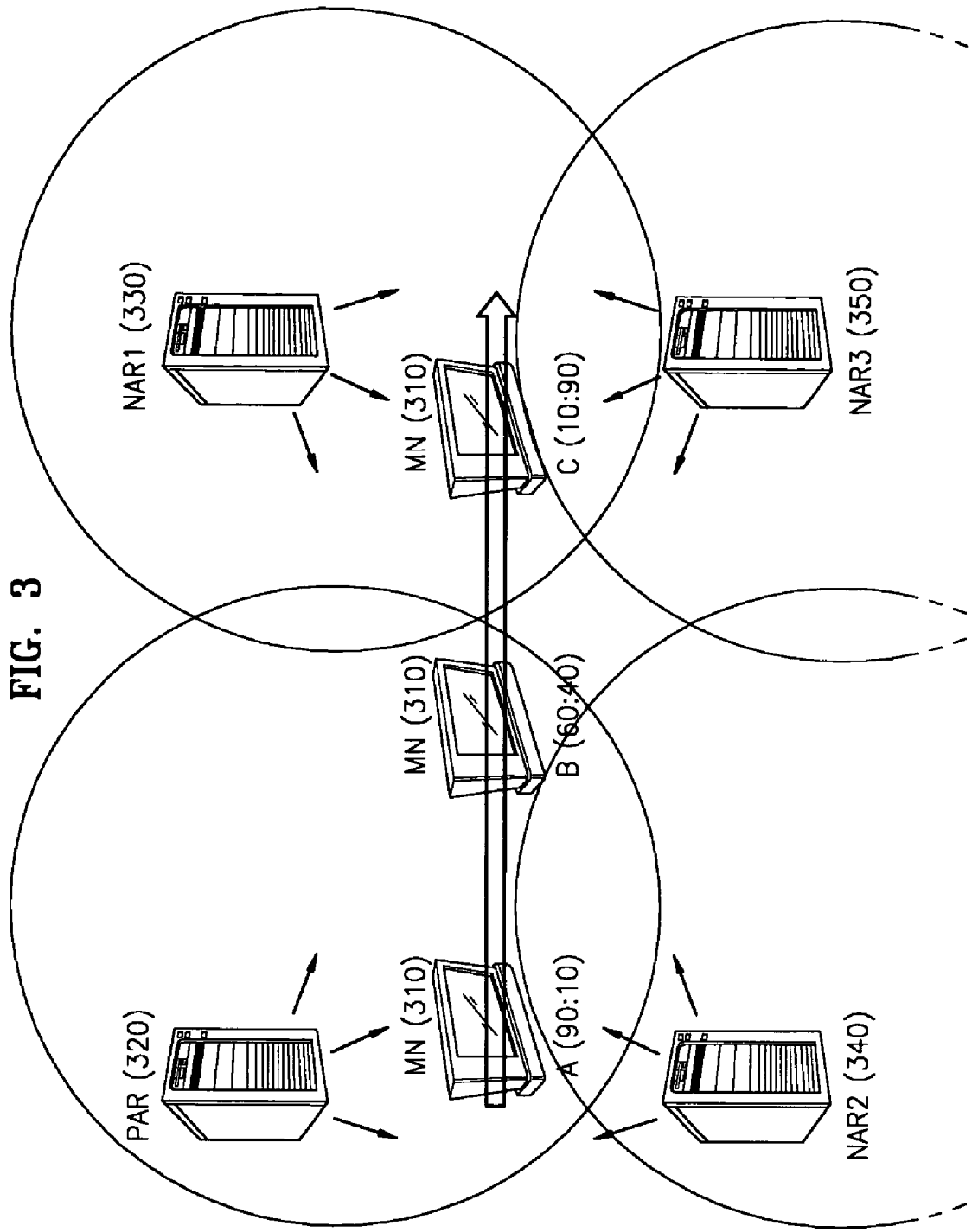
FIG. 3 is a diagram illustrating a high-speed handover method in a wireless LAN environment, according to an exemplary embodiment of the present invention.

FIG. 3 is a diagram illustrating a high-speed handover method in a wireless LAN environment, according to an exemplary embodiment of the present invention.

Let us assume that a mobile node 310 moves from point A to point C via point B. Then the mobile node 310 is predicted to receive beacon signals from previous access router (PAR) (320) and new access routers (NAR)1 (330), NAR2 (340), and NAR3 (350). When the mobile node 310 is located at point A, it can receive only weak beacon signals from NAR2 (340) and NAR3 (350). Therefore, let us assume that the mobile node 310, located at point A, receives beacon signals only from PAR (320) and NAR1 (330) with an intensity ratio of 90:10. As the mobile node 310 moves closer to point C, the intensity of the beacon signal received from PAR (320) weakens but the intensity of the beacon signal received from NAR1(330) strengthens.

While moving from one place to another, the mobile node 310 can predict which access router will be a NAR and obtain information on the NAR before an L2 trigger occurs by calculating the intensity ratio between a beacon signal whose intensity increasingly weakens and a beacon signal whose intensity increasingly strengthens. The beacon signal whose intensity increasingly weakens is supposedly output from a PAR and the beacon signal whose intensity increasingly strengthens is supposedly output from the NAR.

For example, when it is located at point B, the mobile node 130 receives beacon signals from PAR (320) and NAR1 (330) with an intensity ratio of 60:40. If there is a rule that determines a predetermined access router as a NAR for a predetermined mobile node when the intensity of a beacon signal transmitted to the predetermined mobile node from the predetermined access router accounts for 60% or more of the intensity of all beacon signals input into the predetermined mobile node, the mobile node 310 determines NAR1 (330) as its next access router. Then, the mobile node 310 issues a request for NAR information corresponding to the basic service set identification (BSSID) of NAR1 (330) to PAR (320) at point B. PAR (320) searches its distribution service table (DST) for the NAR information requested by the mobile node 310 and transmits the searched NAR information to the mobile node 310. Therefore, the mobile node 310 can successfully obtain the NAR information before an L2 trigger occurs.

Figure 4:
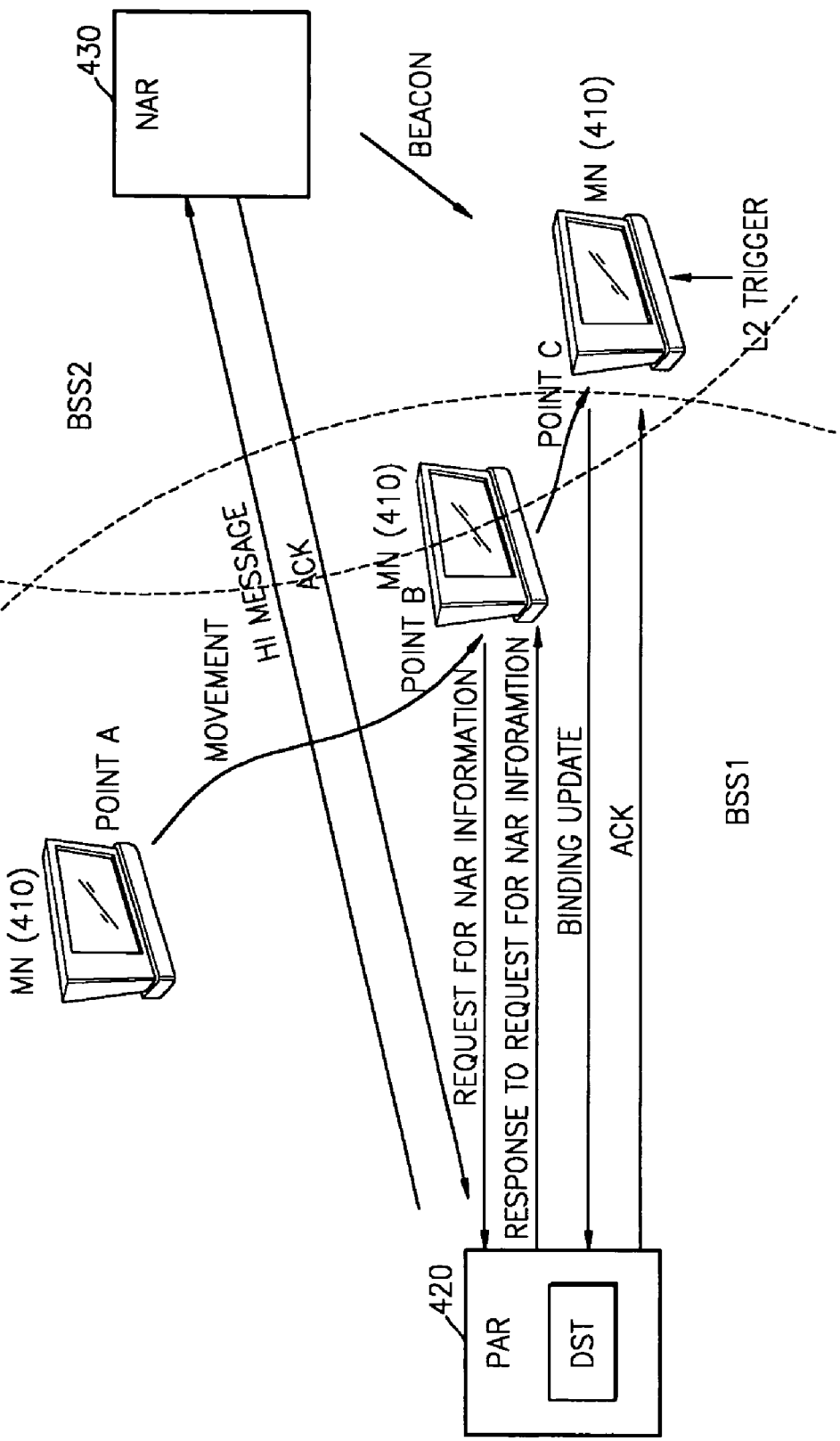
FIG. 4 is a diagram illustrating a network system in which a handover operation is performed according to an exemplary embodiment of the present invention.

FIG. 4 is a diagram illustrating a network system in a wireless LAN environment in which handover is carried out according to an exemplary embodiment of the present invention.

A mobile node 410 predicts what will be the next access router, i.e., NAR (430), at point B on the way to point C from point A and issues a request for information of the predicted access router to PAR (420), receives the requested information from PAR (420) and stores the received information. Then, when an L2 trigger occurs at point C, the mobile node 410 creates a care-of-address (CoA) based on the stored information and carries out binding update using the created CoA. Processes of transmitting such messages as a handover initiate (HI) message and an acknowledgment (ACK) message between PAR 420 and NAR 430 are the same as their counterparts in the prior art.

Figure 5:
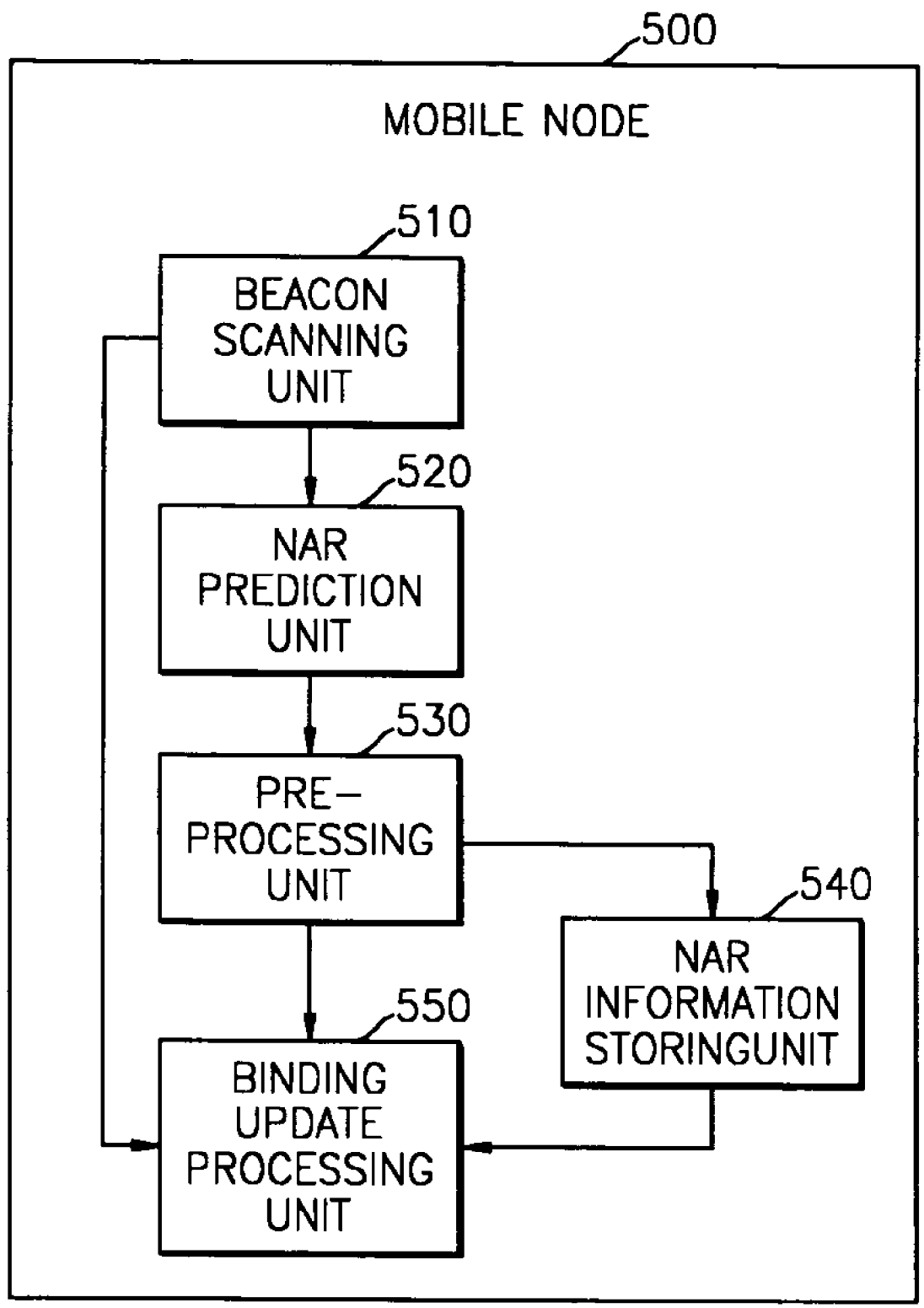
FIG. 5 is a block diagram illustrating a handover device for a mobile node in a wireless LAN environment, according to an exemplary embodiment of the present invention.

FIG. 5 is a block diagram of a mobile node 500 according to an exemplary embodiment of the present invention. The mobile node 500 includes a beacon scanning unit 510, a NAR prediction unit 520, a preprocessing unit 530, a NAR information storing unit 540, and a binding update processing unit 550. The beacon scanning unit 510 scans beacon signals transmitted from neighboring access routers. The NAR prediction unit 520 predicts a NAR based on the intensity of the scanned beacon signals. The preprocessing unit 530 carries out pre-treatment to obtain prefix information of the predicted NAR before an L2 trigger occurs. The NAR information storing unit 540 stores the prefix information of the predicted NAR. The binding update processing unit 550 creates a CoA using the NAR prefix information stored in the NAR information storing unit 540 and transmits a binding update message to a PAR using the CoA.

Figure 6A:
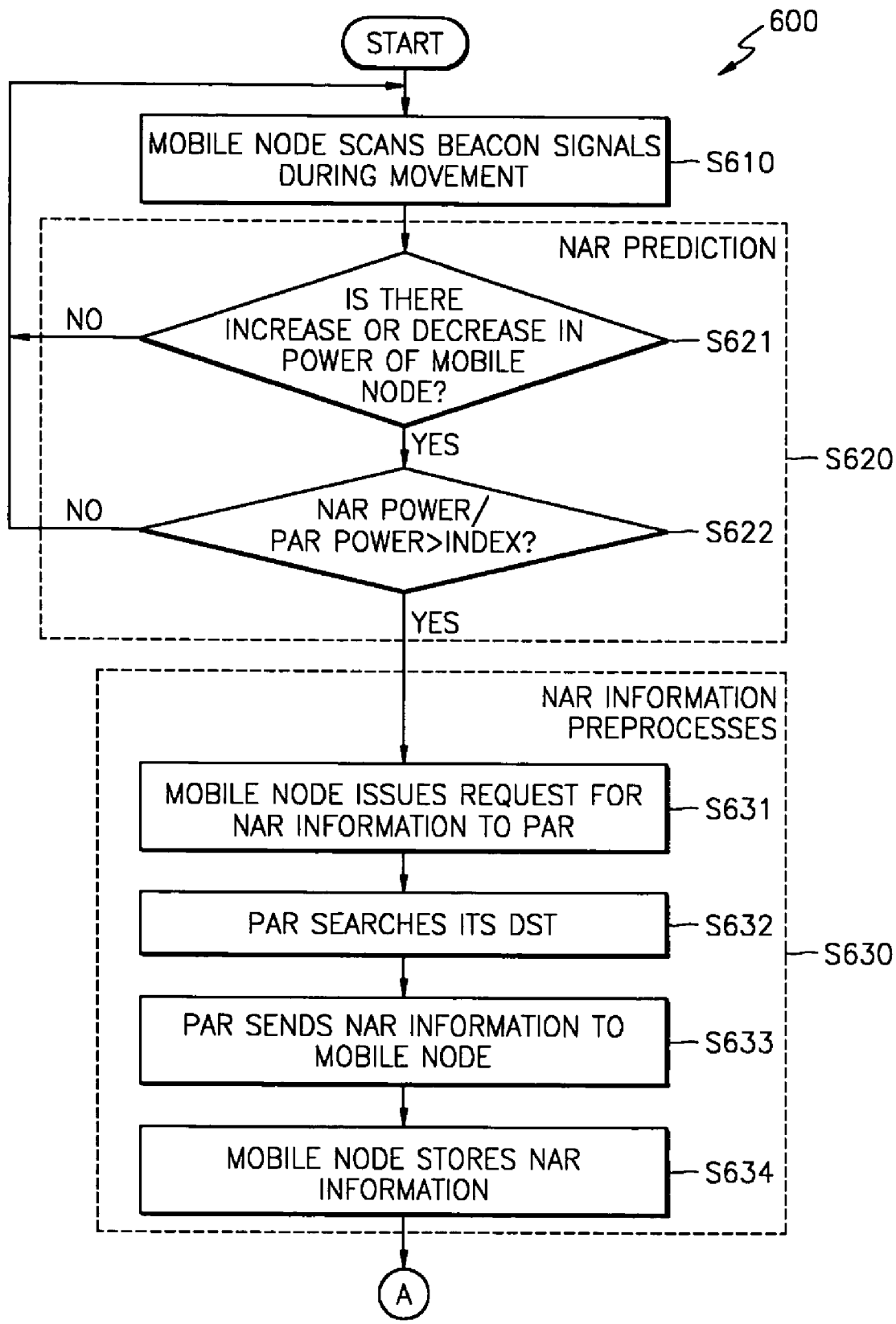

FIGS. 6A and 6B are flowcharts of a handover operation performed in a wireless LAN environment, according to an exemplary embodiment of the present invention.

If a mobile node moves around, L2 searches neighboring access routers through beacon scanning in wireless LAN in step S610.

In step S620, a NAR is predicted using a predetermined prediction algorithm. More specifically, in step S621, it is determined whether or not there is an increase or decrease in the intensity of signals that the mobile node receives through beacon scanning. In other words, the mobile node receives beacon signals from neighboring access routers, and figures out which of the beacon signals has an increasing intensity and which of the neighboring access routers has transmitted the corresponding beacon signal.

If there is not an increase or decrease in the power of the mobile node, which means that the mobile node hardly moves, then it is very difficult to predict a NAR. Thus, the mobile node performs beacon scanning again. Otherwise, in step S622, the mobile node calculates a ratio of the power of a predetermined access router, from which a beacon signal having an increasing intensity is transmitted, with respect to the power of a current access router, i.e., a ratio of the power of a NAR to the power of a PAR, and determines whether the calculated ratio is greater than a predetermined index value. If the calculated ratio is greater than the predetermined index value, the mobile node predicts that the predetermined access router will be the next access router, i.e., the NAR.

In step S630, NAR information pre-processes are carried out. More specifically, the mobile node transmits a BSSID of the predicted NAR to the current access router, i.e., the PAR, and issues a request for information of the predicted NAR to the PAR (in step S631).

Then, the PAR searches its DST, containing information on the neighboring access routers, for the NAR information requested by the mobile node, such as prefix information, a link layer address, and an IP address, in step S632 and transmits the searched information to the mobile node in step S633. The mobile node stores the NAR information transmitted from the PAR in step S634.

When an L2 trigger occurs in the mobile node and the mobile node accesses the predicted NAR in S640, the mobile node carries out binding update in step S650. In other words, the mobile node creates a CoA using its MAC address and the prefix information of the predicted NAR that had already been stored before the occurrence of the L2 trigger and transmits a binding update message to the PAR using the created CoA.

Then, in step S660, the PAR sends an ACK message to the mobile node in response to the reception of the binding update message from the mobile node. In step S670, the PAR transmits an HI message to the NAR. In response to the reception of the HI message, the NAR transmits an ACK message to the PAR in step S680.

The present invention can be realized as computer-readable code written on a computer-readable recording medium. The computer-readable recording medium includes nearly all kinds of recording devices on which data can be recorded in a manner that enables a computer system to read the data. For example, the computer-readable recording medium could be a magnetic tape, such as ROM, RAM, or CD-ROM, a floppy disk, optical data storage, or a carrier wave, such as data transmission through the Internet. In addition, the computer-readable recording medium can be distributed to a plurality of computer systems connected to each other via a network, in which case the present invention can be realized as computer codes stored on the computer-readable recording medium in a decentralized manner.

As described above, according to the present invention, it is possible to reduce handover latency by predicting a new access router to be accessed by a mobile node and obtaining information on the new access router before an L2 trigger occurs.

What is claimed is:

1. A handover method in a wireless LAN environment, comprising:
    a) scanning beacon signals transmitted from neighboring access routers to a mobile node;
    b) predicting only one new access router (NAR) based on the beacon scanning results;
    c) obtaining information on the predicted NAR before an L2 trigger of a link layer occurs; and
    d) carrying out binding update using the information on the predicted NAR when the L2 trigger of the link layer occurs,
    wherein step b), further includes the steps of: determining whether among the scanned beacon signals, there is a beacon signal whose intensity continues to increase and whether a ratio of the intensity of the corresponding beacon signal to the intensity of a beacon signal transmitted from a current access router exceeds a predetermined value, then predicting an access router that has transmitted the corresponding beacon signal as the NAR, and predicting the current access router to be a previous access router (PAR).

2. The handover method of claim 1, wherein step c) comprises:
    c1) issuing a request for prefix information of the predicted NAR to the PAR;
    c2) receiving the prefix information of the predicted NAR from the PAR; and
    c3) storing the received prefix information of the predicted NAR.

3. The handover method of claim 2, wherein step d) comprises:
    d1) creating a care-of-address (CoA) using medium access control (MAC) information of the mobile node and the stored prefix information of the predicted NAR;
    d2) sending a binding update message to the PAR using the created CoA; and
    d3) receiving a binding acknowledgement message from the PAR.

4. A handover device for a mobile node in a wireless LAN environment, the device comprising:
- a beacon scanning unit which scans beacon signals transmitted from access routers adjacent to a mobile node;
- a NAR prediction unit which predicts only one NAR based on the beacon scanning results;
- a preprocessing unit which obtains information on the NAR, predicted by the NAR prediction unit, before an L2 trigger of a link layer occurs;
- a NAR information storing unit which stores the information on the NAR, obtained by the preprocessing unit; and
- a binding update processing unit which carries out binding update using the information of the NAR, stored in the NAR information storing unit, when the L2 trigger of the link layer occurs,
- wherein the NAR prediction unit determines whether among the scanned beacon signals, there is a beacon signal whose intensity continues to increase and whether a ratio of the intensity of the corresponding beacon signal to the intensity of a beacon signal, transmitted from a PAR, exceeds a predetermined value, then the NAR prediction unit predicts an access router that has transmitted the corresponding beacon signal as the NAR.

5. The device of claim 4, wherein the preprocessing unit issues a request for prefix information of the NAR to the PAR, receives the prefix information of the NAR from the PAR, and stores the received prefix information of the NAR in the NAR information storing unit.

6. The device of claim 5, wherein the binding update processing unit creates a care-of-address (CoA) using medium access control (MAC) information of the mobile node and the prefix information of the NAR, stored in the NAR information storing unit, sends a binding update message to the PAR using the created CoA, and receives a binding acknowledgement message from the PAR.

7. A computer-readable recording medium on which a program enabling a handover method is written, the handover method comprising:
- a) scanning beacon signals transmitted from neighboring access routers to a mobile node;
- b) predicting only one new access router (NAR) based on the beacon scanning results;
- c) obtaining information on the predicted NAR before an L2 trigger of a link layer occurs; and
- d) carrying out binding update using the information on the predicted NAR when the L2 trigger of the link layer occurs,
- wherein step b), further includes the steps of: determining whether among the scanned beacon signals, there is a beacon signal whose intensity continues to increase and whether a ratio of the intensity of the corresponding beacon signal to the intensity of a beacon signal transmitted from a current access router exceeds a predetermined value, then predicting an access router that has transmitted the corresponding beacon signal as the NAR, and predicting the current access router to be a previous access router (PAR).

* * * * *